(12) United States Patent
Endo (10) Patent No.: US 11,815,792 B2
(45) Date of Patent: Nov. 14, 2023

(54) LENS BARREL

(71) Applicant: Nittoh Inc., Suwa (JP)

(72) Inventor: Junichi Endo, Suwa (JP)

(73) Assignee: Nittoh Inc.

( * ) Notice: Subject to any disclaimer, the term of this patent is extended or adjusted under 35 U.S.C. 154(b) by 258 days.

(21) Appl. No.: 17/605,717

(22) PCT Filed: Mar. 30, 2020

(86) PCT No.: PCT/JP2020/014451
§ 371 (c)(1),
(2) Date: Oct. 22, 2021

(87) PCT Pub. No.: WO2020/246121
PCT Pub. Date: Dec. 10, 2020

(65) Prior Publication Data
US 2022/0137488 A1    May 5, 2022

(30) Foreign Application Priority Data

Jun. 5, 2019  (JP) ................................. 2019-105173

(51) Int. Cl.
*G03B 17/14*  (2021.01)
*G03B 5/00*  (2021.01)
(52) U.S. Cl.
CPC ............... *G03B 17/14* (2013.01); *G03B 5/00* (2013.01)
(58) Field of Classification Search
None
See application file for complete search history.

(56) References Cited

U.S. PATENT DOCUMENTS 4,175,831 A * 11/1979 Ito ........................ G02B 7/021
                                                           359/823
4,472,032 A *  9/1984 Kamata .................. G02B 7/10
                                                           359/699

(Continued)

FOREIGN PATENT DOCUMENTS

JP          5180741 B2     4/2013

OTHER PUBLICATIONS

International Search Report (English and Japanese) of the International Searching Authority issued in PCT/JP2020/014451, dated Jun. 16, 2020; ISA/5 (5 pages).

*Primary Examiner* — Rodney E Fuller
(74) *Attorney, Agent, or Firm* — Harness, Dickey & Pierce, P.L.C.

(57) ABSTRACT

A lens barrel is provided to be attached to a camera body that can reduce an outer diameter of a back end section of the lens barrel even when a member moving in an optical axis direction is disposed on the back end section of the lens barrel. A lens barrel includes a fixed cylinder, a lens holding frame that is disposed on an inner circumferential side of the fixed cylinder and can move in an optical axis direction relative to the fixed cylinder, a guide cylinder that is disposed on an outer circumferential side of the fixed cylinder and can move, together with the lens holding frame, in the optical axis direction relative to the fixed cylinder, and a rotary cylinder that is disposed on the outer circumferential side of the fixed cylinder and can rotate relative to the fixed cylinder. A front end section of the guide cylinder and the rotary cylinder are disposed further on a front side than a connection part that connects the lens holding frame and the guide cylinder. A power transmission mechanism is disposed between the front end section of the guide cylinder and the rotary cylinder. The power transmission mechanism converts a rotary motion of the rotary cylinder into a linear (Continued)

motion of the guide cylinder to cause the guide cylinder and the lens holding frame to move in the optical axis direction.

16 Claims, 3 Drawing Sheets

(56) References Cited

U.S. PATENT DOCUMENTS

| | | | | |
|---|---|---|---|---|
| 6,118,601 | A * | 9/2000 | Iikawa | G02B 7/04 |
| | | | | 359/699 |
| 2012/0075720 | A1* | 3/2012 | Iikawa | G02B 7/10 |
| | | | | 359/701 |
| 2012/0105712 | A1* | 5/2012 | Terahara | G03B 5/00 |
| | | | | 359/811 |
| 2015/0036039 | A1* | 2/2015 | Nagao | H04N 23/69 |
| | | | | 359/701 |
| 2021/0199916 | A1* | 7/2021 | Shibasaki | G02B 7/10 |

* cited by examiner

LENS BARREL

CROSS REFERENCE TO RELATED APPLICATIONS

This application is a U.S. National Phase Application under 35 U.S.C. 371 of International Application No. PCT/JP2020/014451, filed on Mar. 30, 2020, which claims priority to Japanese Patent Application No. 2019-105173, filed on Jun. 5, 2019. The entire disclosures of the above applications are expressly incorporated by reference herein.

BACKGROUND

Technical Field

The present invention relates to a lens barrel to be attached to a camera body.

Related Art

Lens barrels used by being attached to camera bodies have been known (e.g., refer to Japanese Patent No. 5180741). The lens barrel described in JP5180741 includes a fixed lens, a focus lens, a lens frame holding the fixed lens, and a focus lens cylinder holding the focus lens. The lens barrel described in JP5180741 has a focus ring disposed on its outer circumferential surface. A focusing mechanism and a focus information transmission mechanism are disposed inside the lens barrel.

The focusing mechanism has a function of converting a displacement of the focus ring in a circumferential direction into a displacement in an axial direction by a first movement conversion mechanism to transmit the converted displacement to the focus lens cylinder. The first movement conversion mechanism includes an intermediate rotary cylinder fixed on an inner circumferential side of the focus ring. The intermediate rotary cylinder has a female helicoid screw formed on its inner circumferential surface. The focus lens cylinder has a male helicoid screw that is formed on its outer circumferential surface and screwed to the female helicoid screw formed on the inner circumferential side of the intermediate rotary cylinder.

The focus information transmission mechanism has a function of converting a displacement of the focus ring in the circumferential direction into a displacement in the axial direction by a second movement conversion mechanism to transmit the converted displacement to a transmission reception unit of the camera body. The second movement conversion mechanism includes a first transmission cylinder disposed on an outer circumferential side of an inner fixed cylinder and a second transmission cylinder disposed on an inner circumferential side of the inner fixed cylinder. A front end section of the first transmission cylinder is engaged with a back end section of the intermediate rotary cylinder. The first transmission cylinder has a cam groove formed thereon.

The second transmission cylinder is disposed to a back end section of the lens barrel (i.e., the section of the lens barrel on a side to be attached to the camera body). A restriction roller that is engaged with the cam groove of the first transmission cylinder is attached to an outer circumferential surface of the second transmission cylinder. In the lens barrel described in JP5180741, the intermediate rotary cylinder and the first transmission cylinder rotate together with the focus ring when the focus ring is rotated. When the first transmission cylinder rotates, the second transmission cylinder moves in a direction of an optical axis (optical axis direction) of the lens.

In the lens barrel described in JP5180741, the restriction roller is attached to the outer circumferential surface of the second transmission cylinder so as to move the second transmission cylinder disposed to the back end section of the lens barrel in the optical axis direction. In the lens barrel, the first transmission cylinder on which the cam groove is formed is disposed on the outer circumferential side of the second transmission cylinder. The lens barrel described in JP5180741, thus, has a risk of an outer diameter of the back end section of the lens barrel (i.e., the section of the lens barrel on a side to be attached to the camera body) being increased. When the outer diameter of the back end section of the lens barrel is increased, there is a risk of interference between various components disposed inside the camera body and the back end section of the lens barrel. As a result, there is a risk of reduction in degree of freedom in arrangement of the components disposed inside the camera body.

A problem to be solved by the invention is to provide a lens barrel that is to be attached to a camera body and can reduce an outer diameter of the back end section of the lens barrel (the section of the lens barrel on a side to be attached to the camera body) even when a member moving in the optical axis direction is disposed to the back end section of the lens barrel.

SUMMARY

To solve the problem described above, a lens barrel of the invention that is to be attached to a camera body includes: a fixed cylinder that is formed in a cylindrical shape and fixed to the camera body; a first lens holding frame that holds a lens, is disposed on an inner circumferential side of the fixed cylinder, and capable of moving in an optical axis direction of the lens relative to the fixed cylinder; a guide cylinder that is formed in a cylindrical shape, disposed on an outer circumferential side of the fixed cylinder, and capable of moving, together with the first lens holding frame, in the optical axis direction relative to the fixed cylinder; and a rotary cylinder that is formed in a cylindrical shape, disposed on the outer circumferential side of the fixed cylinder, and capable of rotating about a rotation axis a direction of which is the optical axis direction relative to the fixed cylinder. When a side to be attached to the camera body in the optical axis direction is defined as a back side, and the side opposite to the back side is defined as a front side, a front end section of the guide cylinder and the rotary cylinder are disposed further on the front side than a connection part that connects the first lens holding frame and the guide cylinder, and a first power transmission mechanism is provided between the front end section of the guide cylinder and the rotary cylinder, the first power transmission mechanism converting a rotary motion of the rotary cylinder into a linear motion of the guide cylinder in the optical axis direction to cause the guide cylinder and the first lens holding frame to move in the optical axis direction.

In the lens barrel of the invention, the first power transmission mechanism that causes the guide cylinder and the first lens holding frame to move in the optical axis direction is disposed between the rotary cylinder and the front end section of the guide cylinder that is disposed further on the front side than the connection part connecting the first lens holding frame and the guide cylinder. The invention, thus, does not need to provide a power transmission mechanism such as a cam on the outer circumferential side of the section of the first lens holding frame located further on the back side than the connection part. Therefore, the invention can reduce the outer diameter of the back end section of the lens barrel even when the first lens holding frame moving in the optical axis direction relative to the fixed cylinder is disposed to the back end section of the lens barrel.

In the invention, the first power transmission mechanism is preferably a helicoid mechanism. This structure makes it possible to more downsize the first power transmission mechanism in the radius direction of the lens barrel than a case where the first power transmission mechanism is provided with a cam groove and a cam follower engaged with the cam groove.

In the invention, it is preferable that the front end section of the guide cylinder be disposed on an outer circumferential side of the rotary cylinder, and the helicoid mechanism be provided with a male helicoid screw that is formed on an outer circumferential surface of the rotary cylinder and a female helicoid screw that is formed on an inner circumferential surface of the front end section of the guide cylinder and screwed to the male helicoid screw. This structure makes it possible to more simplify the structures of the rotary cylinder and the guide cylinder than a case where the front end section of the guide cylinder is disposed on the inner circumferential side of the rotary cylinder and the helicoid mechanism is provided with the male helicoid screw formed on the outer circumferential surface of the front end section of the guide cylinder and the female helicoid screw formed on the inner circumferential surface of the rotary cylinder.

In the invention, it is preferable that the connection part include a connection protrusion that is formed on or fixed to the first lens holding frame or the guide cylinder, a first guide hole that passes through the fixed cylinder in a radius direction of the fixed cylinder and has a long hole shape a lengthwise direction of which is the optical axis direction be formed on the fixed cylinder, and a part of the connection protrusion be disposed in the first guide hole. This structure, which is a relatively simple structure including the connection protrusion connecting the first lens holding frame and the guide cylinder, can guide the first lens holding frame and the guide cylinder that are connected each other in the optical axis direction. In addition, the connection protrusion and the first guide hole can prevent the rotation of the first lens holding frame about the rotation axis the direction of which is the optical direction, thereby making it possible to prevent reduction of the optical performance of the lens barrel.

In the invention, it is preferable that the lens barrel include a second lens holding frame that holds a lens and is capable of moving in the optical axis direction relative to the fixed cylinder, the second lens holding frame be disposed on the inner circumferential sides of the rotary cylinder and the fixed cylinder and further on the front side than the first lens holding frame, and a second power transmission mechanism be provided between the second lens holding frame and the rotary cylinder, the second power transmission mechanism converting the rotary motion of the rotary cylinder into a linear motion of the second lens holding frame in the optical axis direction to cause the second lens holding frame to move in the optical axis direction. This structure makes it possible to cause the first lens holding frame and the second lens holding frame to move together in the optical axis direction by the common rotary cylinder. This makes it possible to simplify the structure of the lens barrel.

In the invention, it is preferable that the second power transmission mechanism be provided with a cam groove and a cam follower that is engaged with the cam groove. This structure makes it possible to more simplify the structure of the second power transmission mechanism than a case where the second power transmission mechanism is the helicoid mechanism. When the second power transmission mechanism is the helicoid mechanism, it is necessary to additionally provide a member that is disposed on the outer circumferential side of the fixed cylinder, moves in the optical axis direction together with the second lens holding frame relative to the fixed cylinder, and has a relatively long length in the optical axis direction, for example. In case the second power transmission mechanism is provided with the cam groove and the cam follower, such an aforementioned member is not need to be additionally provided. Therefore, this makes it possible to simplify the structure of the second power transmission mechanism.

In the invention, it is preferable that the front end section of the guide cylinder be disposed on the outer circumferential side of the rotary cylinder, the first power transmission mechanism be a helicoid mechanism that is provided with a male helicoid screw formed on the outer circumferential surface of the rotary cylinder and a female helicoid screw formed on the inner circumferential surface of the front end section of the guide cylinder and screwed to the male helicoid screw, and the cam groove be formed on an inner circumferential surface of the rotary cylinder. This structure, in which the male helicoid screw is formed on the outer circumferential surface of the rotary cylinder and the cam groove is formed on the inner circumferential surface of the rotary cylinder, makes it easy to form the male helicoid screw and the cam groove while the first lens holding frame and the second lens holding frame can be moved in the optical axis direction together by the common rotary cylinder.

In the invention, it is preferable that the cam follower be attached to the second lens holding frame, a second guide hole that passes through the fixed cylinder in a radius direction of the fixed cylinder and has a long hole shape a lengthwise direction of which is the optical axis direction be formed on the fixed cylinder, and a part of the cam follower be disposed in the second guide hole. This relatively simple structure including the cam follower can guide the second lens holding frame in the optical axis direction. The cam follower and the second guide hole that are included in this structure can prevent the rotation of the second lens holding frame about the rotation axis the direction of which is the optical axis direction, thereby making it possible to prevent reduction of the optical performance of the lens barrel.

In the invention, the lens barrel includes a third lens holding frame that holds a lens and is disposed on the inner circumferential side of the fixed cylinder, for example. The lens held by the third lens holding frame is disposed between the lens held by the first lens holding frame and the lens held by the second lens holding frame in the optical axis direction. This structure, in which the third lens holding frame different from the first lens holding frame and the second lens holding frame is disposed between the first lens holding frame and the second lens holding frame, can increase a variation on structure of a moving group in focusing and zooming. The third lens holding frame may be fixed to the fixed cylinder or may move independently from the first lens holding frame and the second lens holding frame, or may move together with the first lens holding frame and the second lens holding frame. A plurality of third lens holding frames may be provided.

In the invention, it is preferable that a restriction protrusion that protrudes to an outside in a radius direction of the fixed cylinder be formed on or fixed to the fixed cylinder, a restriction hole that has a long hole shape a lengthwise direction of which is a circumferential direction of the rotary cylinder be formed on the rotary cylinder, at least a part of the restriction protrusion be disposed in the restriction hole, and the restriction hole and the restriction protrusion restrict a movement of the rotary cylinder in the optical axis direction relative to the fixed cylinder. This relatively simple structure including the restriction protrusion and the restriction hole can restrict the movement of the rotary cylinder in the optical axis direction relative to the fixed cylinder.

In the invention, the lens barrel includes a diaphragm mechanism that is disposed between the lens held by the first lens holding frame and the lens held by the second lens holding frame in the optical axis direction and changes a diameter of an aperture stop, for example. This structure, in which the diaphragm mechanism requiring another drive mechanism is provided between the first lens holding frame and the second lens holding frame that move in the optical axis direction by the rotation of the rotary cylinder, can increase a degree of freedom in design of the whole optical system and a degree of freedom in mechanical structure of the lens barrel.

In the invention, the lens barrel includes a plurality of third lens holding frames that hold lenses and are disposed on the inner circumferential side of the fixed cylinder, for example. The diaphragm mechanism includes an annular bottom plate on which an aperture for an optical path is formed and a plurality of diaphragm blades attached to the bottom plate in a rotatable manner, and the bottom plate is fixed to the third lens holding frame, for example. This structure can further prevent interference of the first lens holding frame or the second lens holding frame with the diaphragm mechanism than a case where the bottom plate is directly fixed to the fixed cylinder. When the diaphragm mechanism is disposed further on the back side than the connection part connecting the first lens holding frame and the guide cylinder, the first lens holding frame is disposed between the fixed cylinder and the diaphragm mechanism. Even in this case, the interference between the diaphragm mechanism and the first lens holding frame can be prevented by fixing the bottom plate to the third lens holding frame.

In the invention, it is preferable that the third lens holding frame include a lens fixing member to which the lens held by the third lens holding frame is fixed, a cylindrical holding member that holds the lens fixing member on an outer circumferential side of the lens fixing member and is fixed to the fixed cylinder, and an adjusting screw configured to adjust a position of the lens fixing member in the radius direction of the fixed cylinder relative to the fixed cylinder, a screw hole to which the adjusting screw is screwed be formed on the holding member, the screw hole pass through the holding member in a radius direction of the holding member, a through hole allowing a tool for rotating the adjusting screw to pass through the through hole be formed on the fixed cylinder, and the through hole pass through the fixed cylinder in the radius direction of the fixed cylinder and be disposed at a position shifted from the rotary cylinder and the guide cylinder in the optical axis direction.

This structure allows the adjusting screw to be rotated by the tool even in a state where the lens barrel has been assembled. This structure, thus, can relatively easily to adjust the position of the lens fixing member in the radius direction relative to the fixed cylinder even after the assembly of the lens barrel. In other words, even after the assembly of the lens barrel, the position of the lens held by the third lens holding frame in the radius direction relative to the fixed cylinder can be relatively easily adjusted.

Advantageous Effects of Invention

As described above, the invention can reduce the outer diameter of the back end section of the lens barrel to be attached to the camera body even when the member moving in the optical axis direction is disposed to the back end section of the lens barrel.

DETAILED DESCRIPTION

The following describes embodiments of the invention with reference to the accompanying drawings.

Structure of Lens Barrel

Figure 1:
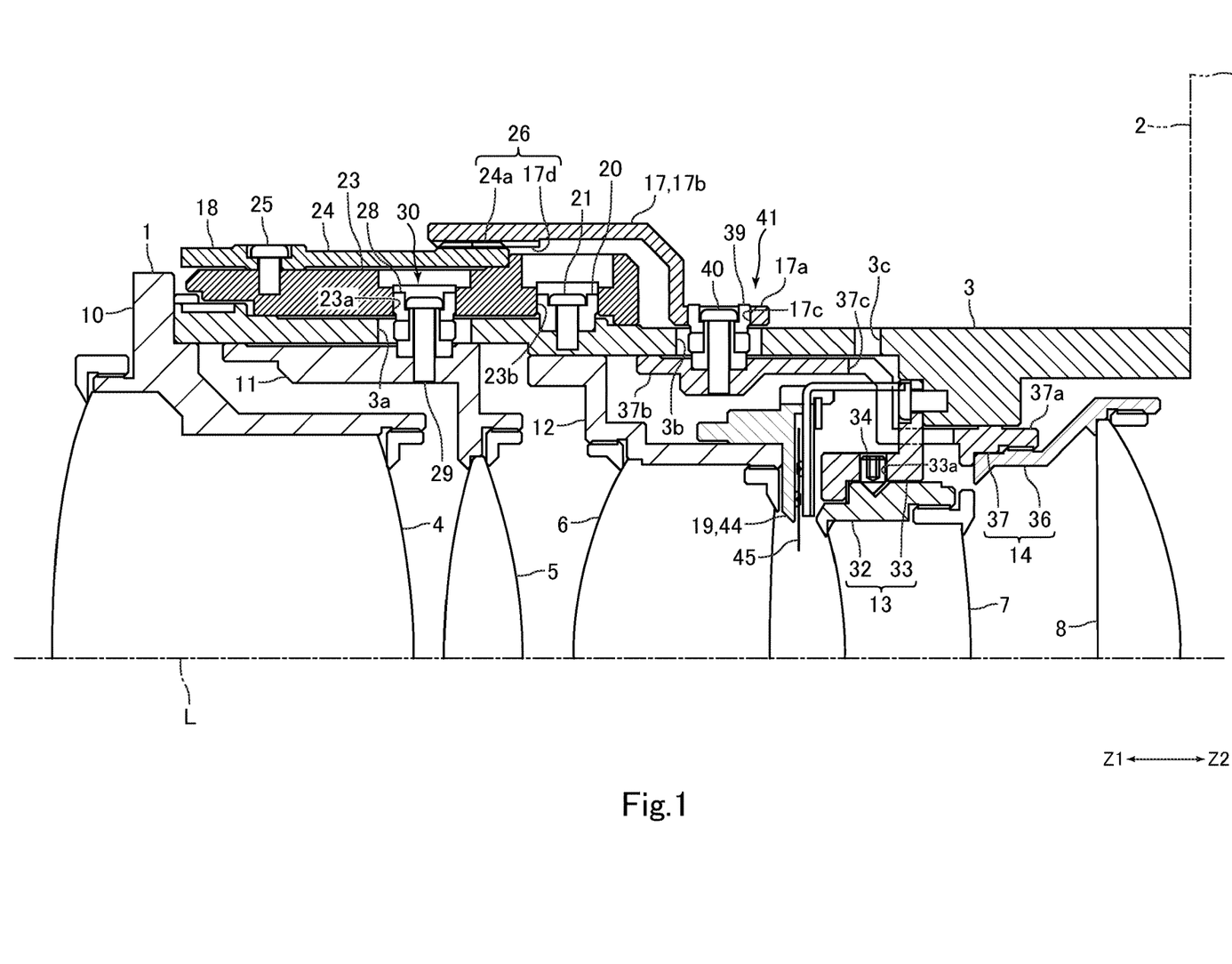
FIG. 1 is a sectional diagram describing a structure of a lens barrel according to an embodiment of the invention.
Figure 2:
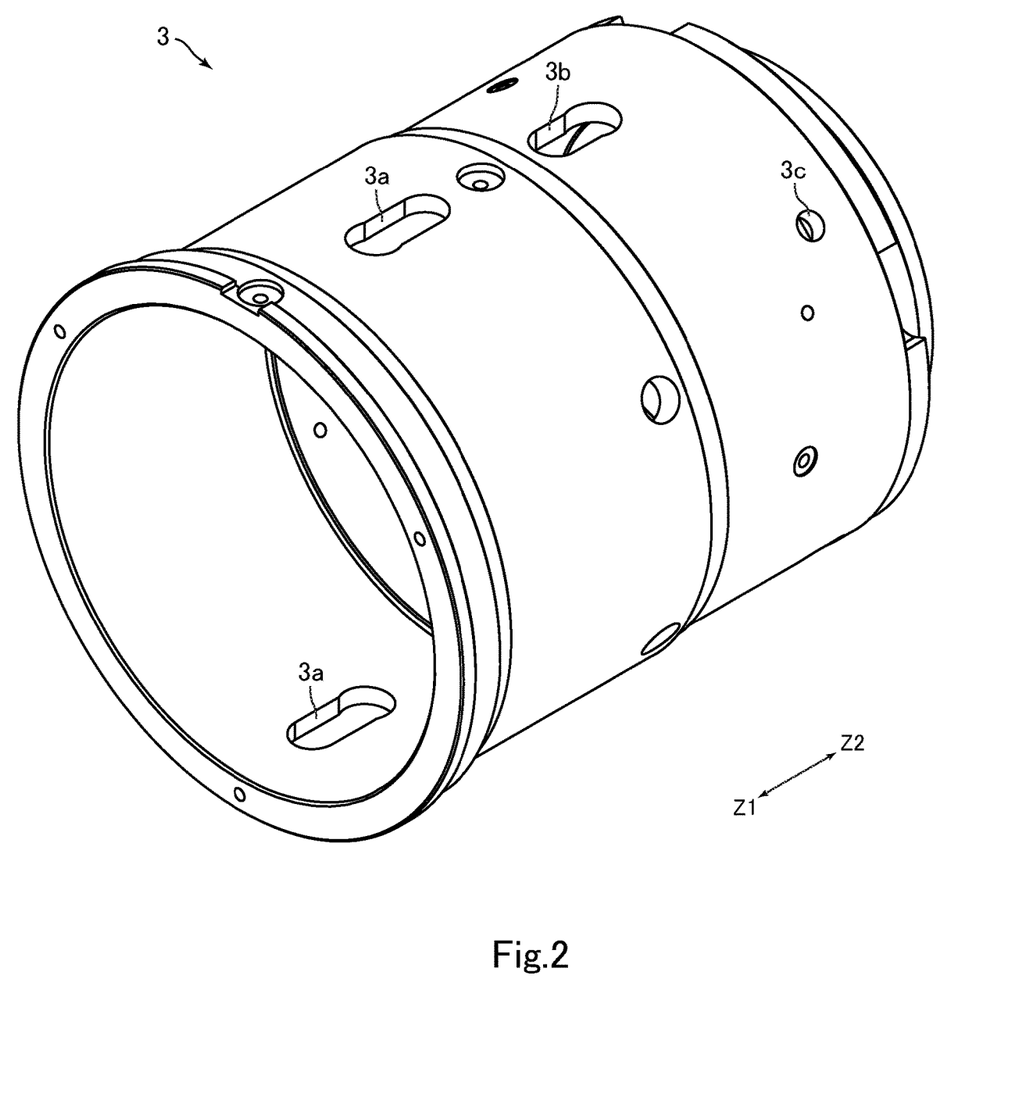
FIG. 2 is a perspective view of a fixed cylinder illustrated in FIG. 1.
Figure 3:
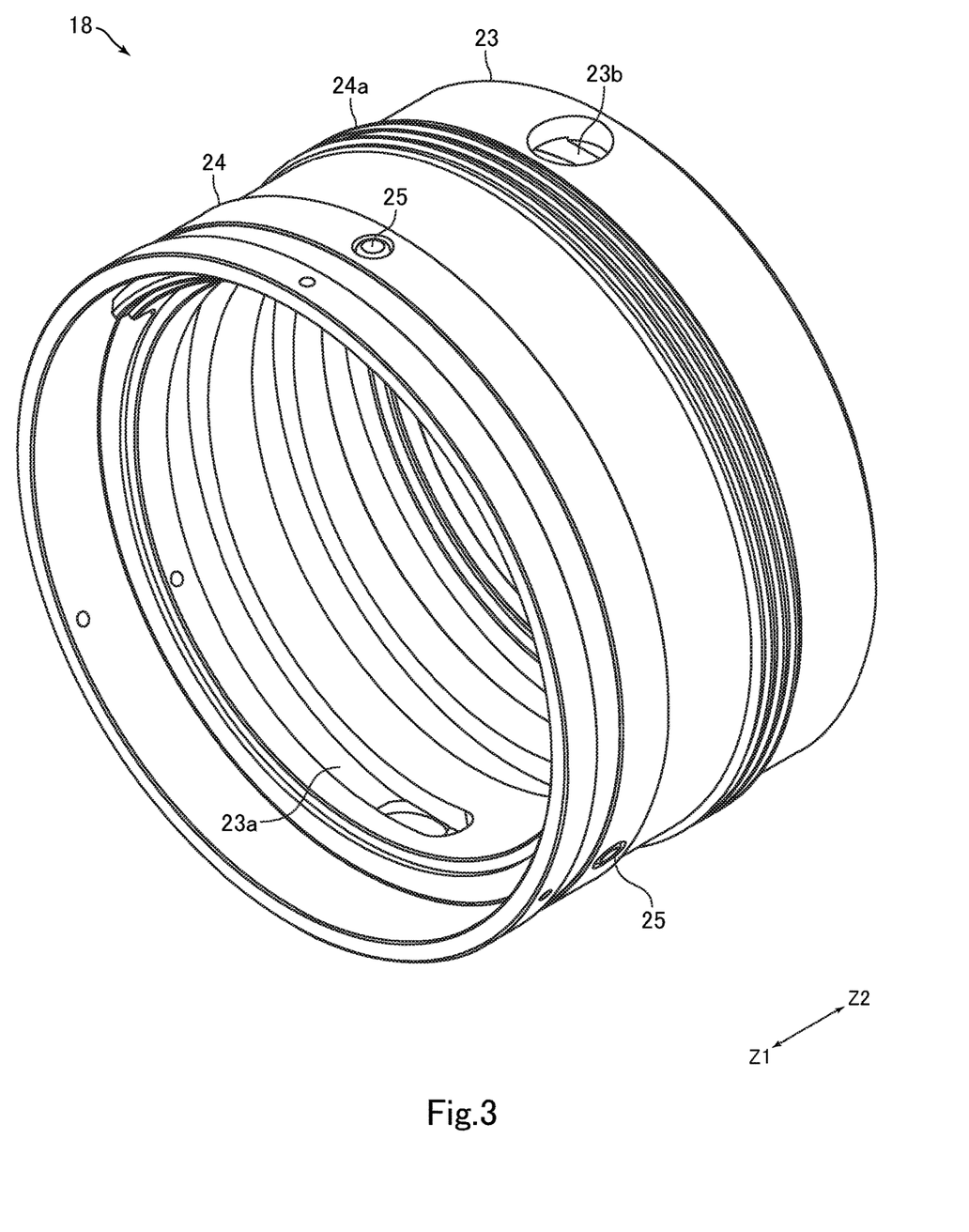
FIG. 3 is a perspective view of a rotary cylinder illustrated in FIG. 1.

FIG. 1 is a sectional diagram describing a structure of a lens barrel 1 according to an embodiment of the invention. FIG. 2 is a perspective view of a fixed cylinder 3 illustrated in FIG. 1. FIG. 3 is a perspective view of a rotary cylinder 18 illustrated in FIG. 1.

The lens barrel 1 in the embodiment is used by being attached to a camera body 2. The camera body 2 includes an imaging element such as a C-MOS image sensor. The lens barrel 1 is formed in a substantially columnar shape as a whole. The lens barrel 1 includes the fixed cylinder 3 that is formed in a cylindrical shape and fixed to the camera body 2, a plurality of lenses 4 to 8 that are disposed on an inner circumferential side of the fixed cylinder 3, a lens holding frame 10 that holds the lens 4, a lens holding frame 11 that holds the lens 5, a lens holding frame 12 that holds the lens 6, a lens holding frame 13 that holds the lens 7, and a lens holding frame 14 that holds the lens 8. The "lens" in the present specification includes not only a single lens but also a lens group composed of a plurality of lenses.

The lenses 4 to 8 are disposed in this order in a direction of an optical axis L of the lenses 4 to 8 (an optical axis direction). Specifically, when a side to be attached to the camera body 2 in the optical axis direction (a Z2 direction side in FIG. 1, for example, an image forming side) is defined as a back side while a Z1 direction side (a subject side) opposite to the back side in FIG. 1, for example, is defined as the front side, the lenses 4 to 8 are disposed in this order from the front side toward the back side. The lens 6 held by the lens holding frame 12 and the lens 7 held by the lens holding frame 13 are disposed between the lens 5 held by the lens holding frame 11 and the lens 8 held by the lens holding frame 14 in the front-back direction (optical axis direction).

The lenses 4, 6, and 7 are fixed lenses that do not move in the front-back direction relative to the fixed cylinder 3. The lens holding frames 10, 12, and 13 are fixed to the fixed cylinder 3. The lenses 5 and 8 are focus lenses that can move in the front-back direction relative to the fixed cylinder 3. The lens holding frames 11 and 14 can move in the front-back direction (optical axis direction) relative to the fixed cylinder 3. The lens holding frame 11 in the embodiment is a second lens holding frame, the lens holding frames 12 and 13 are third lens holding frames, and the lens holding frame 14 is a first lens holding frame.

The lens barrel 1 includes a guide cylinder 17 that is formed in a cylindrical shape and can move, together with the lens holding frame 14, in the front-back direction (optical axis direction) relative to the fixed cylinder 3, a rotary cylinder 18 that is formed in a cylindrical shape and can rotate about the rotation axis the direction of which is the front-back direction (optical axis direction) relative to the fixed cylinder 3, and a diaphragm mechanism 19 that changes a diameter of an aperture stop of the lens barrel 1. The guide cylinder 17 and the rotary cylinder 18 are disposed on an outer circumferential side of the fixed cylinder 3 (the outside in a radius direction of the fixed cylinder 3). The diaphragm mechanism 19 is disposed on the inner circumferential side of the fixed cylinder 3 (the inside in the radius direction of the fixed cylinder 3).

The fixed cylinder 3 is formed in a cylindrical shape and disposed such that the axial direction of the fixed cylinder 3 coincides with the front-back direction. The back end section of the fixed cylinder 3 is fixed to the camera body 2. The fixed cylinder 3 has guide holes 3a and 3b that are formed thereon and pass through the fixed cylinder 3 in the radius direction of the fixed cylinder 3, and through holes 3c that are formed thereon and pass through the fixed cylinder 3 in the radius direction of the fixed cylinder 3. The guide holes 3a and 3b are each formed in a long hole shape the lengthwise direction of which is the front-back direction (optical axis direction). The through holes 3c are each formed in a round hole shape. The guide holes 3a in the embodiment are second guide holes while the guide holes 3b in the embodiment are first guide holes.

The guide holes 3a are formed further on the front side than the guide holes 3b. The guide holes 3a and 3b are formed such that the position of the guide hole 3a and the position of the guide hole 3b in the circumferential direction of the fixed cylinder 3 are the same. The guide holes 3a are formed at two positions in the circumferential direction of the fixed cylinder 3 while the guide holes 3b are formed at two positions in the circumferential direction of the fixed cylinder 3. The two guide holes 3a are disposed at a pitch of 180° with respect to the axial center of the fixed cylinder 3 while the two guide holes 3b are disposed at a pitch of 180° with respect to the axial center of the fixed cylinder 3. The through holes 3c are formed further on the back side than the guide holes 3b. The through holes 3c are formed at three positions in the circumferential direction of the fixed cylinder 3, for example. The three through holes 3c are formed at a pitch of 120° with respect to the axial center of the fixed cylinder 3.

A restriction protrusion 20 for restricting movement of the rotary cylinder 18 in the front-back direction relative to the fixed cylinder 3 is fixed to the fixed cylinder 3. The restriction protrusion 20 protrudes from an outer circumferential surface of the fixed cylinder 3 to an outside in the radius direction of the fixed cylinder 3. The restriction protrusion 20 is disposed between the guide holes 3a and 3b in the front-back direction. The restriction protrusion 20 is fixed to the fixed cylinder 3 with a screw 21.

The rotary cylinder 18 is included in a focus adjustment mechanism that causes the lenses 5 and 8 serving as the focus lenses to move in the front-back direction (optical axis direction). The rotary cylinder 18 is formed in a cylindrical shape and disposed such that the axial direction of the rotary cylinder 18 coincides with the front-back direction. As described above, the rotary cylinder 18 is disposed on the outer circumferential side of the fixed cylinder 3. Specifically, the rotary cylinder 18 is disposed on the outer circumferential side of a front side section of the fixed cylinder 3. The whole of the rotary cylinder 18 is disposed on the outer circumferential side of the fixed cylinder 3.

The front end of the rotary cylinder 18 is disposed further on the back side than the front end of the fixed cylinder 3. The back end of the rotary cylinder 18 is disposed further on the front side than the back end of the fixed cylinder 3. The rotary cylinder 18 is composed of a first cylindrical member 23 on which cam grooves 23a are formed for causing the lens holding frame 11 to move in the front-back direction and a second cylindrical member 24 on which a male helicoid screw 24a is formed for causing the lens holding frame 14 to move in the front-back direction.

The first cylindrical member 23 and the second cylindrical member 24 are formed in a cylindrical shape. The second cylindrical member 24 is disposed on an outer circumferential side of the first cylindrical member 23. The length of the second cylindrical member 24 in the front-back direction is shorter than that of the first cylindrical member 23 in the front-back direction. The front end of the second cylindrical member 24 is disposed further on the front side than the front end of the first cylindrical member 23 while the back end of the second cylindrical member 24 is disposed further on the front side than the back end of the first cylindrical member 23. The first cylindrical member 23 and the second cylindrical member 24 are integrated by being fixed each other with a plurality of screws 25.

As described above, the first cylindrical member 23 has the cam grooves 23a formed thereon. The cam groove 23a is formed in a spiral shape. The cam groove 23a is a bottomed groove formed on a surface on the inner circumferential side of the first cylindrical member 23. The cam groove 23a does not pass through the first cylindrical member 23 in a radius direction of the first cylindrical member 23. A through hole is formed on a part of the cam groove 23a. The through hole passes through the first cylindrical member 23 in the radius direction of the first cylindrical member 23. The cam grooves 23a are formed on the section covered by the second cylindrical member 24 of the first cylindrical member 23. In other words, the cam grooves 23a are formed on the inner circumferential surface of the rotary cylinder 18. Two cam grooves 23a are formed on the first cylindrical member 23.

The two cam grooves 23a are disposed at positions shifted each other in the front-back direction (optical axis direction). When the two cam grooves 23a are formed without being shifted in the front-back direction in a case where a rotation angle of the rotary cylinder 18 is large and a movement amount in the front-back direction of the lens holding frame 11 moved by cam engagement is small, the two cam grooves 23a interfere with each other, thereby causing the two cam grooves 23a to lose their functions structurally. Such a problem is dissolved by disposing the two cam grooves 23a to be shifted from each other in the front-back direction.

The first cylindrical member 23 has a restriction hole 23b that is formed thereon and to which a part of the restriction protrusion 20 is disposed. The restriction hole 23b is a bottomed groove formed on the surface on the inner circumferential side of the first cylindrical member 23. The restriction hole 23b does not pass through the first cylindrical member 23 in the radius direction of the first cylindrical member 23. A through hole that passes through the first cylindrical member 23 in the radius direction of the first cylindrical member 23 is formed on a part of the restriction hole 23b. The restriction protrusion 20 is fixed to the fixed cylinder 3 via the through hole formed on a part of the restriction hole 23b.

The restriction hole 23b is formed on the back end section of the first cylindrical member 23. Specifically, the restriction hole 23b is formed on the section of the first cylindrical member 23, the section being disposed further on the back side than the back end of the second cylindrical member 24. The restriction hole 23b is formed in a long hole shape (long groove shape) the lengthwise direction of which is the circumferential direction of the first cylindrical member 23. In other words, the rotary cylinder 18 has the restriction hole 23b that is formed as a bottomed groove on the surface on the inner circumferential side of the first cylindrical member 23 without passing through the rotary cylinder 18 in the radius direction of the rotary cylinder 18, and in a long groove shape the lengthwise direction of which is the circumferential direction of the rotary cylinder 18.

In the embodiment, the restriction hole 23b and the restriction protrusion 20 restrict the movement of the rotary cylinder 18 in the front-back direction (optical axis direction) relative to the fixed cylinder 3. In other words, the restriction protrusion 20 a part of which is disposed in the restriction hole 23b causes the rotary cylinder 18 not to move in the front-back direction relative to the fixed cylinder 3. The restriction hole 23b is formed in a long groove shape the lengthwise direction of which is the circumferential direction of the rotary cylinder 18. The restriction protrusion 20, thus, moves inside the restriction hole 23b in the circumferential direction by being guided by the restriction hole 23b. The restriction protrusion 20 that moves inside the restriction hole 23b in the circumferential direction allows the rotary cylinder 18 to rotate about the rotation axis the direction of which is the front-back direction at a certain angle relative to the fixed cylinder 3.

In the embodiment, the restriction hole 23b is a single annular shaped groove having no end in the circumferential direction of the first cylindrical member 23. Thus, the restriction protrusion 20 can move inside the restriction hole 23b without stopping. Even when the number of restriction protrusions 20 is increased and the distance between the adjacent restriction protrusions 20 is smaller than the rotation angle of the rotary cylinder 18 due to the increase, this structure makes it possible to prevent interference between the restriction protrusions 20 and the restriction hole 23b in the circumferential direction by inserting all of the restriction protrusions 20 into the single annular shaped restriction hole 23b. As a result, the lens barrel 1 can be prevented from being increased in size even when the number of restriction protrusions 20 is increased for preventing the rotary cylinder 18 from being tilted with respect to the fixed cylinder 3 or for dispersing shock at the time when external force such as external shock is transmitted between the restriction protrusions 20 and the restriction hole 23b from the optical axis direction.

When no member that restricts the movement of the restriction protrusion 20 in the circumferential direction is present in the structure described above, the rotary cylinder 18 can be moved until a cam follower 28, which is described later, attached to the lens holding frame 11 collides with the end of the cam groove 23a of the rotary cylinder 18. The collision of the cam follower 28 with the end of the cam groove 23a, however, may adversely affect imaging such as blurring of an image caused by transmission of impact at the collision to the lens 5 via the lens holding frame 11. The collision may also adversely affect an optical performance due to the impact causing positional shift or inclination of the lens holding frame 11 and the lens 5.

The embodiment restricts a rotation amount of the rotary cylinder 18 in the circumferential direction relative to the fixed cylinder 3 with a stopper (not illustrated) fixed to the fixed cylinder 3 and a rotation restriction lateral groove (not illustrated) that is formed on the surface on the inner circumferential side of the first cylindrical member 23 and has an end in the circumferential direction. The restriction of the rotation amount of the rotary cylinder 18 in the circumferential direction with the stopper fixed to the fixed cylinder 3 can prevent direct transmission of impact to the lens holding frame 11 even when the rotary cylinder 18 is rotated in the circumferential direction to its rotation limit.

The rotation direction can be restricted by making the cam follower 28 of the lens holding frame 11 collide with the cam groove 23a of the rotary cylinder 18 or the end of the guide hole 3a of the fixed cylinder 3.

In this case, the lens 5 held by the lens holding frame 11 is preferably a lens having a low sensitivity against shift and inclination relative to the optical axis in the optical axis direction in the optical system composed of lenses held by the lens barrel 1. Such a structure can prevent occurrence of influence on the optical performance without additionally providing the stopper and the rotation restriction lateral groove even when the impact is transmitted to the lens 5, thereby making it possible to simplify the structure.

In the embodiment, the restriction hole 23b is formed in a single continuous long groove shape. The restriction hole 23b, however, can be formed in a long groove shape having ends in the circumferential direction in one of the following cases: the rotation amount of the rotary cylinder 18 in the circumferential direction is allowed to be small, the number of restriction protrusions 20 is allowed to be reduced without problems, and a plurality of restriction holes 23b are allowed to be formed by being shifted in the front-back direction (optical axis direction). Those cases make it unnecessary to form the restriction hole 23b in a single continuous annular long groove shape. In this case, the rotation amount of the rotary cylinder 18 in the circumferential direction relative to the fixed cylinder 3 can be restricted by making the end of the restriction hole 23b collision with the restriction protrusion 20 without additionally providing the stopper and the rotation restriction lateral groove.

As described above, the male helicoid screw 24a is formed on the second cylindrical member 24. The male helicoid screw 24a is formed on the outer circumferential surface of the second cylindrical member 24. In other words, the male helicoid screw 24a is formed on the outer circumferential surface of the rotary cylinder 18. The male helicoid screw 24a is formed on the back end section of the second cylindrical member 24. In the embodiment, a motor, which is not illustrated, is connected to the second cylindrical member 24. The rotary cylinder 18 is rotated by power of the motor. The rotary cylinder 18 may be rotated manually by a user.

The guide cylinder 17, which is formed in a stepped cylindrical shape, is disposed such that the axial direction of the guide cylinder 17 coincides with the front-back direction. As described above, the guide cylinder 17 is disposed on the outer circumferential side of the fixed cylinder 3. Specifically, the whole of the guide cylinder 17 is disposed on the outer circumferential side of the fixed cylinder 3. The front end of the guide cylinder 17 is disposed further on the back side than the front edge of the fixed cylinder 3. The back end of the guide cylinder 17 is disposed further on the front side than the back end of the fixed cylinder 3. The guide cylinder 17 has a cylindrical small diameter section 17a that is the back end section of the guide cylinder 17 and a large diameter section 17b that has an outer diameter and an inner diameter larger than those of the small diameter section 17a.

The small diameter section 17a is connected to the back end of the large diameter section 17b. The small diameter section 17a is disposed further on the back side than the rotary cylinder 18 and along the outer circumferential surface of the fixed cylinder 3. The small diameter section 17a is disposed further on the front side than the through hole 3c of the fixed cylinder 3. The small diameter section 17a has a through hole 17c formed thereon for connecting the lens holding frame 14 and the guide cylinder 17. The through hole 17c passes through the small diameter section 17a in the radius direction of the small diameter section 17a. The through hole 17c is formed in a round hole shape.

The large diameter section 17b is disposed on the outer circumferential side of the rotary cylinder 18. Specifically, the large diameter section 17b is disposed on the outer circumferential side of a section on the back side of the rotary cylinder 18. In other words, the front end section of the guide cylinder 17 is disposed on the outer circumferential side of the rotary cylinder 18. A female helicoid screw 17d that is screwed to the male helicoid screw 24a of the rotary cylinder 18 is formed on the inner circumferential surface of the front end section of the guide cylinder 17 (i.e., the front end section of the large diameter section 17b).

In the embodiment, the male helicoid screw 24a and the female helicoid screw 17d constitute a power transmission mechanism 26 that converts a rotary motion of the rotary cylinder 18 into a linear motion of the guide cylinder 17 in the front-back direction to cause the guide cylinder 17 and the lens holding frame 14 to move in the front-back direction. In other words, the power transmission mechanism 26 that converts the rotary motion of the rotary cylinder 18 into the linear motion of the guide cylinder 17 in the front-back direction (optical axis direction) to cause the guide cylinder 17 and the lens holding frame 14 to move in the front-back direction (optical axis direction) is provided between the front end section of the guide cylinder 17 and the rotary cylinder 18. The power transmission mechanism 26 is a helicoid mechanism provided with the male helicoid screw 24a and the female helicoid screw 17d. The power transmission mechanism 26 in the embodiment is a first power transmission mechanism.

The front end section of the lens holding frame 10 is disposed further on the front side than the front end of the fixed cylinder 3. A most section of the lens holding frame 10 excluding the front end section is disposed on the inner circumferential side of the fixed cylinder 3. The lens holding frame 10 is fixed to the front end section of the fixed cylinder 3 with a screw, which is not illustrated. The lens holding frame 12 is disposed on the inner circumferential side of the fixed cylinder 3. Specifically, the whole of the lens holding frame 12 is disposed on the inner circumferential side of the fixed cylinder 3. The lens holding frame 12 is fixed to the fixed cylinder 3 with a screw, which is not illustrated.

The lens holding frame 11 is disposed on the inner circumferential side of the fixed cylinder 3. Specifically, the whole of the lens holding frame 11 is disposed on the inner circumferential side of the fixed cylinder 3. The lens holding frame 11 is disposed on the inner circumferential side of the rotary cylinder 18. The lens holding frame 11 is disposed further on the front side than the lens holding frame 14. The cam follower 28 engaged with the cam groove 23a is attached to the lens holding frame 11. The cam follower 28 protrudes from the lens holding frame 11 to the outside in the radius direction of the fixed cylinder 3. The cam follower 28 is attached to the lens holding frame 11 with a screw 29. The cam follower 28 is attached to the lens holding frame 11 with the screw 29 in a state where the lens holding frame 11 is disposed on the inner circumferential side of the fixed cylinder 3, the first cylindrical member 23 of the rotary cylinder 18 is disposed on the outer circumferential side of the fixed cylinder 3, and the cam follower 28 after passing through the through hole of the cam groove 23a and the guide hole 3a from the outer circumferential side of the first cylindrical member 23 is abutted to the lens holding frame 11.

The same number of cam followers 28 as the number of cam grooves 23a formed on the first cylindrical member 23 are attached to the lens holding frame 11. In other words, the two cam followers 28 are attached to the lens holding frame 11. Each of the two cam followers 28 engages with one of the two cam grooves 23a. The two cam followers 28 are disposed at positions shifted from each other in the circumferential direction of the fixed cylinder 3. The two cam followers 28 are also disposed at positions shifted from each other in the front-back direction (optical axis direction). A shift amount between the two cam followers 28 in the front-back direction corresponds to the shift amount between the two cam grooves 23a in the front-back direction.

In the embodiment, the cam grooves 23a and the cam followers 28 constitute a power transmission mechanism 30 that converts the rotary motion of the rotary cylinder 18 into the linear motion of the lens holding frame 11 in the front-back direction to cause the lens holding frame 11 to move in the front-back direction. In other words, the power transmission mechanism 30 that converts the rotary motion of the rotary cylinder 18 into the linear motion of the lens holding frame 11 in the front-back direction (optical axis direction) to cause the lens holding frame 11 to move in the front-back direction (optical axis direction) is provided between the lens holding frame 11 and the rotary cylinder 18. The power transmission mechanism 30 in the embodiment is a second power transmission mechanism.

A part of the cam follower 28 is disposed in the guide hole 3a. In the embodiment, the guide holes 3a and the cam followers 28 prevent the rotation of the lens holding frame 11 about the rotation axis the direction of which is the front-back direction relative to the fixed cylinder 3. The cam follower 28 moves in the front-back direction along the guide hole 3a. The lens holding frame 11 moving in the front-back direction (optical axis direction) is guided by the guide hole 3a and the cam follower 28 in the front-back direction.

The lens holding frame 13 is disposed on the inner circumferential side of the fixed cylinder 3. Specifically, the whole of the lens holding frame 13 is disposed on the inner circumferential side of the fixed cylinder 3. The lens holding frame 13 includes a lens fixing member 32 to which the lens 7 is fixed and a holding member 33 that holds the lens fixing member 32 on the outer circumferential side of the lens fixing member 32. The lens fixing member 32 and the holding member 33 are formed in a cylindrical shape. The holding member 33 is fixed to the fixed cylinder 3. The lens holding frame 13 includes an adjusting screw 34 configured to adjust a position of the lens fixing member 32 in the radius direction of the fixed cylinder 3 relative to the fixed cylinder 3. The adjusting screw 34 is a hexagon socket set screw.

The holding member 33 has a screw hole 33a that is formed thereon and to which the adjusting screw 34 is screwed. The screw hole 33a passes through the holding member 33 in the radius direction of the holding member 33. The screw holes 33a are formed at three positions in the circumferential direction of the holding member 33, for example. The three screw holes 33a are formed with a pitch of 120° with respect to the axial center of the holding member 33, for example. In the embodiment, the position of the lens fixing member 32 relative to the fixed cylinder 3 in the radius direction of the fixed cylinder 3 is adjusted by adjusting amounts of screwing of the three adjusting screws 34 into the screw holes 33a. In other words, the position of the lens 7 relative to the fixed cylinder 3 in the radius direction of the fixed cylinder 3 is adjusted by adjusting the amounts of screwing of the three adjusting screws 34 into the screw holes 33a.

As described above, the small diameter section 17a of the guide cylinder 17 is disposed further on the back side than the rotary cylinder 18. The small diameter section 17a is disposed further on the front side than the through hole 3c of the fixed cylinder 3. The through hole 3c is disposed at the position shifted from the rotary cylinder 18 and the guide cylinder 17 in the front-back direction (optical axis direction). Specifically, the through hole 3c is disposed further on the back side than the rotary cylinder 18 and the guide cylinder 17. In the circumferential direction of the fixed cylinder 3, the through hole 3c is disposed at the position where the adjusting screw 34 is disposed.

In the embodiment, a tool for rotating the adjusting screw 34 passes through the through hole 3c when the amount of screwing of the adjusting screw 34 into the screw hole 33a is adjusted. In other words, the fixed cylinder 3 has the through hole 3c that is formed thereon and through which the tool for rotating the adjusting screw 34 passes. Specifically, the tip of the screw driver passes through the through hole 3c when the amount of screwing of the adjusting screw 34 into the screw hole 33a is adjusted.

The lens holding frame 14 is disposed on the inner circumferential side of the fixed cylinder 3. Specifically, the whole of the lens holding frame 14 is disposed on the inner circumferential side of the fixed cylinder 3. The lens holding frame 14 includes a lens fixing member 36 to which the lens 8 is fixed and a holding member 37 to which the lens fixing member 36 is fixed. The lens fixing member 36 is the back end section of the lens holding frame 14. The front end section of the lens fixing member 36 is fixed to the back end section of the holding member 37. The lens 8 is fixed to the back end section of the lens holding frame 14.

The holding member 37, which is formed in a stepped cylindrical shape, is disposed such that the axial direction of the holding member 37 coincides with the front-back direction. The holding member 37 has a cylindrical small diameter section 37a, which is the back end section of the holding member 37, and a large diameter section 37b having an outer diameter and an inner diameter larger than those of the small diameter section 37a. The small diameter section 37a is connected to the back end of the large diameter section 37b. The lens fixing member 36 is fixed to the back end section of the small diameter section 37a. The front end of the holding member 37 (i.e., the front end of the large diameter section 37b) is disposed further on the back side than the back end of the female helicoid screw 17d of the guide cylinder 17. The front end of the holding member 37 may be disposed further on the front side than the back end of the female helicoid screw 17d.

A connection protrusion 39 disposed in the through hole 17c of the guide cylinder 17 is fixed to the front end section of the large diameter section 37b. In other words, the connection protrusion 39 is fixed to the lens holding frame 14. The connection protrusion 39 protrudes from the outer circumferential surface of the large diameter section 37b to the outside in the radius direction of the large diameter section 37b. The connection protrusion 39 is fixed to the large diameter section 37b with a screw 40. The connection protrusion 39 is inserted into the through hole 17c and a part of the connection protrusion 39 is fitted to the through hole 17c. In the embodiment, the through hole 17c of the guide cylinder 17 and the connection protrusion 39 constitute a connection part 41 that connects the lens holding frame 14 and the guide cylinder 17.

The connection part 41 is disposed further on the back sides than the large diameter section 17b of the guide cylinder 17 and the rotary cylinder 18. In other words, the front end section of the guide cylinder 17 and the rotary cylinder 18 are disposed further on the front side than the connection part 41. The connection protrusion 39 is disposed at the position where the guide hole 3b is formed in the front-back direction. A part of the connection protrusion 39 is disposed in the guide hole 3b. In the embodiment, the guide hole 3b and the connection protrusion 39 prevent the rotation of the lens holding frame 14 and the guide cylinder 17 about the rotation axis the direction of which is the front-back direction relative to the fixed cylinder 3. The guide cylinder 17 rotates about the rotation axis the direction of which is the front-back direction relative to the rotary cylinder 18, but does not rotate relative to the fixed cylinder 3.

The connection protrusion 39 moves in the front-back direction along the guide hole 3b. The guide cylinder 17 and the lens holding frame 14 that move in the front-back direction (optical axis direction) are guided by the guide hole 3b and the connection protrusion 39 in the front-back direction. A through hole 37c through which the tool for rotating the adjusting screw 34 passes is formed on the holding member 37 in a certain range extending from a boundary between the small diameter section 37a and the large diameter section 37b to both sides in the front-back direction. The through hole 37c passes through the holding member 37 in the radius direction of the holding member 37.

The diaphragm mechanism 19 is disposed between the lenses 5 and 8 in the front-back direction (optical axis direction). The diaphragm mechanism 19 includes an annular bottom plate 44 on which an aperture for an optical path is formed and a plurality of diaphragm blades 45 attached to the bottom plate 44 in a rotatable manner. The bottom plate 44 is fixed to the back end section of the lens holding frame 12 with a screw, which is not illustrated. The bottom plate 44 is fixed to the fixed cylinder 3 via the lens holding frame 12.

The diaphragm blades 45 are disposed between the lenses 6 and 7 in the front-back direction. In other words, the lens 6 is disposed between the lens 5 and the diaphragm blades 45 in the front-back direction (optical axis direction) while the lens 7 is disposed between the lens 8 and the diaphragm blades 45 in the front-back direction (optical axis direction). The diaphragm blades 45 are disposed further on the back side than the connection part 41. In other words, the connection part 41 is disposed further on the front side than the diaphragm blades 45. A rotation mechanism (not illustrated) that causes the diaphragm blades 45 to rotate is connected to the diaphragm blades 45. The rotation mechanism includes a motor and the like.

Major Effects of the Embodiment

As described above, the lens barrel 1, which is to be attached to the camera body 2, in the embodiment includes:

the fixed cylinder 3 that is formed in a cylindrical shape and fixed to the camera body 2; the lens holding frame 14 that holds the lens 8, is disposed on the inner circumferential side of the fixed cylinder 3, and can move in the optical axis direction of the lens 8 relative to the fixed cylinder 3; the guide cylinder 17 that is formed in a cylindrical shape, disposed on the outer circumferential side of the fixed cylinder 3, and can move, together with the lens holding frame 14, in the optical axis direction relative to the fixed cylinder 3; and the rotary cylinder 18 that is formed in a cylindrical shape, disposed on the outer circumferential side of the fixed cylinder 3, and can rotate about the rotation axis the direction of which is the optical axis direction relative to the fixed cylinder 3. In the embodiment, when the side to be attached to the camera body 2 in the optical axis direction is defined as the back side, and the side opposite to the back side is defined as the front side, the front end section of the guide cylinder 17 and the rotary cylinder 18 are disposed further on the front side than the connection part 41 that connects the lens holding frame 14 and the guide cylinder 17. In the embodiment, the power transmission mechanism 26 is provided between the front end section of the guide cylinder 17 and the rotary cylinder 18, the power transmission mechanism 26 converting the rotary motion of the rotary cylinder 18 into the linear motion of the guide cylinder 17 in the optical axis direction to cause the guide cylinder 17 and the lens holding frame 14 to move in the optical axis direction.

As described above, in the embodiment, the power transmission mechanism 26 that causes the guide cylinder 17 and the lens holding frame 14 to move in the optical axis direction is disposed between the rotary cylinder 18 and the front end section of the guide cylinder 17 that is disposed further on the front side than the connection part 41 connecting the lens holding frame 14 and the guide cylinder 17. The embodiment, thus, does not need to provide the power transmission mechanism such as a cam on the outer circumferential side of the section of the lens holding frame 14 located further on the back side than the connection part 41. Therefore, the embodiment can reduce the outer diameter of the back end section of the lens barrel 1 even when the lens holding frame 14 moving in the optical axis direction relative to the fixed cylinder 3 is disposed to the back end section of the lens barrel 1.

As described in the embodiment, the power transmission mechanism 26 is preferably the helicoid mechanism. This structure makes it possible to more downsize the power transmission mechanism 26 in the radius direction of the lens barrel 1 than a case where the power transmission mechanism 26 is provided with a cam groove and a cam follower engaged with the cam groove.

As described in the embodiment, it is preferable that the front end section of the guide cylinder 17 be disposed on the outer circumferential side of the rotary cylinder 18, and the helicoid mechanism serving as the power transmission mechanism 26 be provided with the male helicoid screw 24a that is formed on the outer circumferential surface of the rotary cylinder 18 and the female helicoid screw 17d that is formed on the inner circumferential surface of the front end section of the guide cylinder 17 and screwed to the male helicoid screw 24a. This structure makes it possible to more simplify the structures of the rotary cylinder 18 and the guide cylinder 17 than a case where the front end section of the guide cylinder 17 is disposed on the inner circumferential side of the rotary cylinder 18 and the helicoid mechanism is provided with the male helicoid screw formed on the outer circumferential surface of the front end section of the guide cylinder 17 and the female helicoid screw formed on the inner circumferential surface of the rotary cylinder 18.

As described in the embodiment, it is preferable that the connection part 41 include the connection protrusion 39 that is fixed to the lens holding frame 14, the guide hole 3b that passes through the fixed cylinder 3 in the radius direction of the fixed cylinder 3 and has a long hole shape a lengthwise direction of which is the optical axis direction be formed on the fixed cylinder 3, and a part of the connection protrusion 39 be disposed in the guide hole 3b. This structure, which is a relatively simple structure including the connection protrusion 39 connecting the lens holding frame 14 and the guide cylinder 17, can guide the lens holding frame 14 and the guide cylinder 17 that are connected each other in the optical axis direction. In addition, the connection protrusion 39 and the guide hole 3b can prevent the rotation of the lens holding frame 14 about the rotation axis the direction of which is the front-back direction, thereby making it possible to prevent reduction of the optical performance of the lens barrel 1.

As described in the embodiment, it is preferable that the lens barrel 1 include the lens holding frame 11 that holds the lens 5 and can move in the optical axis direction relative to the fixed cylinder 3, the lens holding frame 11 be disposed on the inner circumferential sides of the rotary cylinder 18 and the fixed cylinder 3 and further on the front side than the lens holding frame 14, and the power transmission mechanism 30 be provided between the lens holding frame 11 and the rotary cylinder 18, the power transmission mechanism 30 converting the rotary motion of the rotary cylinder 18 into the linear motion of the lens holding frame 11 in the optical axis direction to cause the lens holding frame 11 to move in the optical axis direction. This structure makes it possible to cause the lens holding frame 14 and the lens holding frame 11 to move together in the optical axis direction by the common rotary cylinder 18. This makes it possible to simplify the structure of the lens barrel 1.

As described in the embodiment, the power transmission mechanism 30 is preferably provided with the cam groove 23a and the cam follower 28 engaged with the cam groove 23a. This structure makes it possible to more simplify the structure of the power transmission mechanism 30 than a case where the power transmission mechanism 30 is the helicoid mechanism. When the power transmission mechanism 30 is the helicoid mechanism, it is necessary to additionally provide a member that is disposed on the outer circumferential side of the fixed cylinder 3, moves in the optical axis direction together with the lens holding frame 11 relative to the fixed cylinder 3, and has a relatively long length in the optical axis direction, for example. In case the power transmission mechanism 30 is provided with the cam groove 23a and the cam follower 28, such an aforementioned member is not need to be additionally provided. This makes it possible to simplify the structure of the power transmission mechanism 30.

As described in the embodiment, it is preferable that the front end section of the guide cylinder 17 be disposed on the outer circumferential side of the rotary cylinder 18, the power transmission mechanism 26 be the helicoid mechanism that is provided with the male helicoid screw 24a that is formed on the outer circumferential surface of the rotary cylinder 18 and the female helicoid screw 17d that is formed on the inner circumferential surface of the front end section of the guide cylinder 17 and screwed to the male helicoid screw 24a, and the cam groove 23a be formed on the inner circumferential surface of the rotary cylinder 18. This structure, in which the male helicoid screw 24a is formed on the outer circumferential surface of the rotary cylinder 18 and the cam groove 23*a* is formed on the inner circumferential surface of the rotary cylinder 18, makes it easy to form the male helicoid screw 24*a* and the cam groove 23*a* while the lens holding frame 14 and the lens holding frame 11 can be moved together in the optical axis direction by the common rotary cylinder 18.

As described in the embodiment, it is preferable that the cam follower 28 be attached to the lens holding frame 11, the guide hole 3*a* that passes through the fixed cylinder 3 in the radius direction of the fixed cylinder 3 and has a long hole shape a lengthwise direction of which is the optical axis direction be formed on the fixed cylinder 3, and a part of the cam follower 28 be disposed in the guide hole 3*a*. This relatively simple structure including the cam follower 28 can guide the lens holding frame 11 in the optical axis direction. The cam follower 28 and the guide hole 3*a* can prevent the rotation of the lens holding frame 11 about the rotation axis the direction of which is the optical axis direction, thereby making it possible to prevent reduction of the optical performance of the lens barrel 1.

As described in the embodiment, it is preferable that the restriction protrusion 20 that protrudes to the outside in the radius direction of the fixed cylinder 3 be fixed to the fixed cylinder 3, the restriction hole 23*b* that has a long hole shape a lengthwise direction of which is the circumferential direction of the rotary cylinder 18 be formed on the rotary cylinder 18, at least a part of the restriction protrusion 20 be disposed in the restriction hole 23*b*, and the restriction hole 23*b* and the restriction protrusion 20 restrict the movement of the rotary cylinder 18 in the optical axis direction relative to the fixed cylinder 3. This relatively simple structure including the restriction protrusion 20 and the restriction hole 23*b* can restrict the movement of the rotary cylinder 18 in the optical axis direction relative to the fixed cylinder 3.

As described in the embodiment, it is preferable that the lens holding frame 13 include the lens fixing member 32 to which the lens 7 is fixed, the cylindrical holding member 33 that holds the lens fixing member 32 on the outer circumferential side of the lens fixing member 32 and is fixed to the fixed cylinder 3, and the adjusting screw 34 configured to adjust the position of the lens fixing member 32 in the radius direction of the fixed cylinder 3 relative to the fixed cylinder 3, the screw hole 33*a* to which the adjusting screw 34 is screwed be formed on the holding member 33, the screw hole 33*a* pass through the holding member 33 in the radius direction of the holding member 33, the through hole 3*c* allowing the tool for rotating the adjusting screw 34 to pass through the through hole 3*c* be formed on the fixed cylinder 3, and the through hole 3*c* pass through the fixed cylinder 3 in the radius direction of the fixed cylinder 3 and be disposed at a position shifted from the rotary cylinder 18 and the guide cylinder 17 in the optical axis direction.

This structure makes it possible to rotate the adjusting screw 34 with the tool even in a state where the lens barrel 1 has been assembled. This structure, thus, can relatively easily to adjust the position of the lens fixing member 32 in the radius direction relative to the fixed cylinder 3 even after the assembly of the lens barrel 1. In other words, even after the assembly of the lens barrel 1, the position of the lens 7 held by the lens holding frame 13 in the radius direction relative to the fixed cylinder 3 can be relatively easily adjusted.

As described in the embodiment, the whole of the lens holding frames 11 to 14 is preferably disposed on the inner circumferential side of the fixed cylinder 3. This structure can more downsize the lens barrel 1 in the radius direction of the fixed cylinder 3 than a case where a part of the lens holding frames 11 to 14 is disposed on the outer circumferential side of the fixed cylinder 3.

As described in the embodiment, the rotary cylinder 18 is preferably provided with the first cylindrical member 23 on which the cam groove 23*a* is formed and the second cylindrical member 24 on which the male helicoid screw 24*a* is formed.

This structure allows the cam groove 23*a* to be formed such that the cam groove 23*a* passes through at least a part of the first cylindrical member 23 in the radius direction of the first cylindrical member 23, thereby making it possible to easily form the cam groove 23*a*. In addition, even when the cam groove 23*a* is formed such that the cam groove 23*a* passes through at least a part of the first cylindrical member 23, this structure allows the cam groove 23*a* and the male helicoid screw 24*a* to be disposed by overlapping with each other, thereby making it possible to shorten the length of the rotary cylinder 18 in the optical axis direction. This structure of the rotary cylinder 18 composed of the two components allows the structure of each component to be simplified, thereby making it possible to reduce manufacturing difficulty.

As described in the embodiment, it is preferable that the front ends of the lens holding frame 11, the guide cylinder 17, and the rotary cylinder 18 be disposed further on the back side than the front end of the fixed cylinder 3 while the back ends of the lens holding frame 14, the guide cylinder 17, and the rotary cylinder 18 be disposed further on the front side than the fixed cylinder 3. This structure can downsize the lens barrel 1 in the optical axis direction.

As described in the embodiment, the whole of the guide cylinder 17 is preferably disposed on the outer circumferential side of the fixed cylinder 3. When a part of the guide cylinder 17 is disposed on the inner circumferential side of the fixed cylinder 3, a space for disposing the guide cylinder 17 needs to be provided both inner circumferential side and outer circumferential side of the fixed cylinder 3, causing the size of the lens barrel 1 in the radius direction of the fixed cylinder 3 to be increased. The preferable structure can, however, downsize the lens barrel 1 in the radius direction of the fixed cylinder 3.

As described in the embodiment, the whole of the rotary cylinder 18 is preferably disposed on the outer circumferential side of the fixed cylinder 3. When a part of the rotary cylinder 18 is disposed on the inner circumferential side of the fixed cylinder 3, a space for disposing the rotary cylinder 18 needs to be provided both the inner circumferential side and outer circumferential side of the fixed cylinder 3, thereby causing the size of the lens barrel 1 to be increased in the radius direction of the fixed cylinder 3. The preferable structure can, however, downsize the lens barrel 1 in the radius direction of the fixed cylinder 3.

Other Embodiments

In the embodiment described above, the power transmission mechanism 26 may be provided with a female helicoid screw formed on the inner circumferential surface of the rotary cylinder 18 and a male helicoid screw formed on the outer circumferential surface of the guide cylinder 17. In the embodiment described above, the power transmission mechanism 26 may be provided with a cam groove that is formed either one of the rotary cylinder 18 and the guide cylinder 17 and a cam follower that is formed on or fixed to the other of the rotary cylinder 18 and the guide cylinder 17. In the embodiment described above, the power transmission mechanism 30 may be a helicoid mechanism. In the embodiment described above, the lens holding frame 11 may be fixed to the fixed cylinder 3. In this case, the power transmission mechanism 30 is unnecessary.

In the embodiment described above, the rotary cylinder 18 is composed of the first cylindrical member 23 and the second cylindrical member 24, i.e., two members. The rotary cylinder 18 may be composed of a single member. In the embodiment described above, the connection protrusion 39 may be formed integrally with the lens holding frame 14. In the embodiment described above, the connection protrusion 39 may be fixed to the small diameter section 17a of the guide cylinder 17 or formed integrally with the small diameter section 17a. In the embodiment described above, the restriction protrusion 20 may be formed integrally with the fixed cylinder 3.

In the embodiment described above, three cam grooves 23a may be formed on the first cylindrical member 23. In this case, three cam followers 28 are attached to the lens holding frame 11 such that the three cam followers 28 are disposed at positions shifted from one another in the circumferential direction of the fixed cylinder 3. The three cam followers 28 are also disposed at positions shifted from one another in the front-back direction (optical axis direction). In the embodiment described above, the cam followers 28 may be formed integrally with the lens holding frame 11.

In the embodiment described above, the power transmission mechanism 26, which is the first drive transmission mechanism, is disposed further on the back side than the power transmission mechanism 30, which is the second drive transmission mechanism, so as to downsize the back end side of the lens barrel 1. If the front end side of the lens barrel 1 needs to be downsized in the radius direction, the first drive transmission mechanism may be disposed further on the front side than the second drive transmission mechanism.

In the embodiment described above, the lens holding frame 14, which is the first lens holding frame, is disposed on the most back side among the lens holding frames disposed in the lens barrel 1. However, another lens holding frame may be disposed further on the back side than the first lens holding frame. The lens moving as the focus lens is not disposed on the most back end side depending on the lens arrangement in some cases. Even in such a case, the invention has an effect on downsizing the outer shape around the drive mechanism of the focus lens.

The invention claimed is:

1. A lens barrel to be attached to a camera body, the lens barrel comprising:
    a fixed cylinder that is formed in a cylindrical shape and fixed to the camera body;
    a first lens holding frame that holds a lens, is disposed on an inner circumferential side of the fixed cylinder, and capable of moving in an optical axis direction of the lens relative to the fixed cylinder;
    a guide cylinder that is formed in a cylindrical shape, disposed on an outer circumferential side of the fixed cylinder, and capable of moving, together with the first lens holding frame, in the optical axis direction relative to the fixed cylinder; and
    a rotary cylinder that is formed in a cylindrical shape, disposed on the outer circumferential side of the fixed cylinder, and capable of rotating about a rotation axis a direction of which is the optical axis direction relative to the fixed cylinder, wherein
    when a side to be attached to the camera body in the optical axis direction is defined as a back side, and the side opposite to the back side is defined as a front side,
    a front end section of the guide cylinder and the rotary cylinder are disposed further on the front side than a connection part that connects the first lens holding frame and the guide cylinder, and
    a first power transmission mechanism is provided between the front end section of the guide cylinder and the rotary cylinder, the first power transmission mechanism converting a rotary motion of the rotary cylinder into a linear motion of the guide cylinder in the optical axis direction to cause the guide cylinder and the first lens holding frame to move in the optical axis direction.

2. The lens barrel according to claim 1, wherein the first power transmission mechanism is a helicoid mechanism.

3. The lens barrel according to claim 2, wherein
    the front end section of the guide cylinder is disposed on an outer circumferential side of the rotary cylinder, and
    the helicoid mechanism is provided with a male helicoid screw that is formed on an outer circumferential surface of the rotary cylinder and a female helicoid screw that is formed on an inner circumferential surface of the front end section of the guide cylinder and screwed to the male helicoid screw.

4. The lens barrel according to claim 1, wherein
    the connection part includes a connection protrusion that is formed on or fixed to the first lens holding frame or the guide cylinder,
    a first guide hole that passes through the fixed cylinder in a radius direction of the fixed cylinder and has a long hole shape a lengthwise direction of which is the optical axis direction is formed on the fixed cylinder, and
    a part of the connection protrusion is disposed in the first guide hole.

5. The lens barrel according to claim 1, further comprising a second lens holding frame that holds a lens and is capable of moving in the optical axis direction relative to the fixed cylinder, wherein
    the second lens holding frame is disposed on the inner circumferential sides of the rotary cylinder and the fixed cylinder and further on the front side than the first lens holding frame, and
    a second power transmission mechanism is provided between the second lens holding frame and the rotary cylinder, the second power transmission mechanism converting the rotary motion of the rotary cylinder into a linear motion of the second lens holding frame in the optical axis direction to cause the second lens holding frame to move in the optical axis direction.

6. The lens barrel according to claim 5, wherein the second power transmission mechanism is provided with a cam groove and a cam follower that is engaged with the cam groove.

7. The lens barrel according to claim 6, wherein
    the front end section of the guide cylinder is disposed on the outer circumferential side of the rotary cylinder,
    the first power transmission mechanism is a helicoid mechanism that is provided with a male helicoid screw formed on the outer circumferential surface of the rotary cylinder and a female helicoid screw formed on the inner circumferential surface of the front end section of the guide cylinder and screwed to the male helicoid screw, and
    the cam groove is formed on an inner circumferential surface of the rotary cylinder.

8. The lens barrel according to claim 7, wherein
    the cam follower is attached to the second lens holding frame, a second guide hole that passes through the fixed cylinder in a radius direction of the fixed cylinder and has a long hole shape a lengthwise direction of which is the optical axis direction is formed on the fixed cylinder, and a part of the cam follower is disposed in the second guide hole.

9. The lens barrel according to claim 6, wherein the cam follower is attached to the second lens holding frame, a second guide hole that passes through the fixed cylinder in a radius direction of the fixed cylinder and has a long hole shape a lengthwise direction of which is the optical axis direction is formed on the fixed cylinder, and a part of the cam follower is disposed in the second guide hole.

10. The lens barrel according to claim 5, further comprising a third lens holding frame that holds a lens and is disposed on the inner circumferential side of the fixed cylinder, wherein the lens held by the third lens holding frame is disposed between the lens held by the first lens holding frame and the lens held by the second lens holding frame in the optical axis direction.

11. The lens barrel according to claim 10, wherein a restriction protrusion that protrudes to an outside in a radius direction of the fixed cylinder is formed on or fixed to the fixed cylinder, a restriction hole that has a long hole shape a lengthwise direction of which is a circumferential direction of the rotary cylinder is formed on the rotary cylinder, at least a part of the restriction protrusion is disposed in the restriction hole, and the restriction hole and the restriction protrusion restrict a movement of the rotary cylinder in the optical axis direction relative to the fixed cylinder.

12. The lens barrel according to claim 11, wherein the third lens holding frame includes a lens fixing member to which the lens held by the third lens holding frame is fixed, a cylindrical holding member that holds the lens fixing member on an outer circumferential side of the lens fixing member and is fixed to the fixed cylinder, and an adjusting screw configured to adjust a position of the lens fixing member in the radius direction of the fixed cylinder relative to the fixed cylinder, a screw hole to which the adjusting screw is screwed is formed on the holding member, the screw hole passes through the holding member in a radius direction of the holding member, a through hole allowing a tool for rotating the adjusting screw to pass through the through hole is formed on the fixed cylinder, and the through hole passes through the fixed cylinder in the radius direction of the fixed cylinder and is disposed at a position shifted from the rotary cylinder and the guide cylinder in the optical axis direction.

13. The lens barrel according to claim 10, wherein the third lens holding frame includes a lens fixing member to which the lens held by the third lens holding frame is fixed, a cylindrical holding member that holds the lens fixing member on an outer circumferential side of the lens fixing member and is fixed to the fixed cylinder, and an adjusting screw configured to adjust a position of the lens fixing member in the radius direction of the fixed cylinder relative to the fixed cylinder, a screw hole to which the adjusting screw is screwed is formed on the holding member, the screw hole passes through the holding member in a radius direction of the holding member, a through hole allowing a tool for rotating the adjusting screw to pass through the through hole is formed on the fixed cylinder, and the through hole passes through the fixed cylinder in the radius direction of the fixed cylinder and is disposed at a position shifted from the rotary cylinder and the guide cylinder in the optical axis direction.

14. The lens barrel according to claim 5, further comprising a diaphragm mechanism that is disposed between the lens held by the first lens holding frame and the lens held by the second lens holding frame in the optical axis direction and changes a diameter of an aperture stop.

15. The lens barrel according to claim 14, further comprising a plurality of third lens holding frames that hold lenses and are disposed on the inner circumferential side of the fixed cylinder, wherein the diaphragm mechanism includes an annular bottom plate on which an aperture for an optical path is formed and a plurality of diaphragm blades attached to the bottom plate in a rotatable manner, and the bottom plate is fixed to the third lens holding frame.

16. The lens barrel according to claim 15, wherein the third lens holding frame includes a lens fixing member to which the lens held by the third lens holding frame is fixed, a cylindrical holding member that holds the lens fixing member on an outer circumferential side of the lens fixing member and is fixed to the fixed cylinder, and an adjusting screw configured to adjust a position of the lens fixing member in the radius direction of the fixed cylinder relative to the fixed cylinder, a screw hole to which the adjusting screw is screwed is formed on the holding member, the screw hole passes through the holding member in a radius direction of the holding member, a through hole allowing a tool for rotating the adjusting screw to pass through the through hole is formed on the fixed cylinder, and the through hole passes through the fixed cylinder in the radius direction of the fixed cylinder and is disposed at a position shifted from the rotary cylinder and the guide cylinder in the optical axis direction.

\* \* \* \* \*